US011916697B2

(12) United States Patent
Ishizaki

(10) Patent No.: US 11,916,697 B2
(45) Date of Patent: Feb. 27, 2024

(54) RING NETWORK COMMUNICATION SYSTEM

(71) Applicant: Honda Motor Co., Ltd., Tokyo (JP)

(72) Inventor: Ryusuke Ishizaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/152,152

(22) Filed: Jan. 10, 2023

(65) Prior Publication Data

US 2023/0283502 A1 Sep. 7, 2023

(30) Foreign Application Priority Data

Mar. 3, 2022 (JP) ................................ 2022-032357

(51) Int. Cl.
*H04L 12/42* (2006.01)

(52) U.S. Cl.
CPC ........ *H04L 12/42* (2013.01); *H04L 2012/421* (2013.01)

(58) Field of Classification Search
CPC .......................... H04L 12/42; H04L 2012/421
See application file for complete search history.

(56) References Cited

U.S. PATENT DOCUMENTS 6,944,165 B2 * 9/2005 Fujiyama ................ H04L 49/90 370/443
10,250,406 B2 * 4/2019 Ishizaki .................. H04L 12/42
10,250,407 B2 * 4/2019 Ishizaki ................ H04L 49/351
10,447,527 B2 * 10/2019 Ishizaki ................ H04L 12/427
10,742,444 B2 * 8/2020 Ishizaki ................ H04L 12/423

FOREIGN PATENT DOCUMENTS

JP 2001326663 11/2001
JP 6471021 2/2019
JP 6527399 6/2019

* cited by examiner

*Primary Examiner* — Rasheed Gidado
(74) *Attorney, Agent, or Firm* — JCIPRNET

(57) ABSTRACT

Multiple nodes (2) of a ring network communication system (1) include a heteronomous node (22) and an autonomous node (23). The heteronomous node (22) operates in a heteronomous mode in which data generated by a data generation part (8) of an own node is transmitted as transmitted data Dt only when received data Dir received by a data reception part (13) includes a data transmission request. The autonomous node (23) operates in an autonomous mode in which the data generated by the data generation part (8) of the own node is transmitted as the transmitted data Dt regardless of reception of the received data Dir including the data transmission request. Data including the data transmission request is not required for the autonomous node, and the control period is shortened.

8 Claims, 9 Drawing Sheets

RING NETWORK COMMUNICATION SYSTEM

CROSS-REFERENCE TO RELATED APPLICATION

This application claims the priority benefit of Japan application serial No. 2022-032357, filed on Mar. 3, 2022. The entirety of the above-mentioned patent application is hereby incorporated by reference herein and made a part of this specification.

BACKGROUND

Technical Field

The invention relates to a ring network communication system in which multiple nodes are communicably connected via a ring network.

Description of Related Art

Conventionally, a ring network system in which multiple computers (network nodes) are connected with each other via a ring-type network is known. Among ring networks, a token-ring communication scheme in which signal collisions can be avoided by allowing only a node with a token to transmit data is known (see Patent Document 1). Meanwhile, in the ring-token scheme, it is not possible for multiple nodes on the network to transmit data at the same time.

Therefore, the Applicant has proposed ring network systems allowing multiple nodes to transmit data at the same time (see Patent Documents 2 and 3). In such systems, the node has a data transmission part and an output switching part. The data transmission part has a data transmission block which transmits data generated by the own node as transmitted data, and a data relay block, which relays, as relay data, transmitted data transmitted from another node. The output switching part switches and outputs data of one of the transmitted data and the relay data as output data.

PRIOR ART DOCUMENTS

Patent Documents

[Patent Document 1] Japanese Laid-Open No. 2001-326663
[Patent Document 2] Japanese Patent No. 6471021
[Patent Document 3] Japanese Patent No. 6527399

The communication system of Patent Document 2, for example, includes one node as a primary control unit (central control unit), multiple nodes as secondary control units (motor driving control units) controlling motor drivers driving joints, and multiple nodes as secondary control units (sensor control units) controlling sensors. In a system in which multiple sensors are connected, such as a multi-link robot, the central control unit transmits control commands to all the motor drivers at a predetermined control period, and transmits request commands for obtaining sensor data.

However, in such conventional ring network communication system, as the number of nodes increase, data are transmitted continuously or frequently, and the required data transmission from other nodes may be obstructed or delayed.

For example, in the case where several tactile sensors are connected to the network in order to measure the distribution of external force received by the robot over a predetermined region, the number of times of request commands increase in accordance with the number of sensors, and the control period needs to increase to transfer all data.

SUMMARY

An aspect of the invention provides a ring network communication system for transmitting data in a direction in a ring network in which a plurality of nodes are formed in a ring shape. Each of the nodes includes: a data generation part, generating data to be transmitted to another node; a data transmission part, having a data transmission block transmitting data generated by the data generation part of an own node as generated data and a data relay block transmitting data transmitted from the another node as relay data to be relayed; an output switching part, switching data transmitted to the another node as the generated data transmitted by the data transmission block and the relay data relayed by the data relay block and outputting the data as transmitted data; and a data reception part, receiving the data transmitted from the another node as received data. The nodes include: a heteronomous node, operating in a heteronomous mode in which data generated by the data generation part of the own node is transmitted as the transmitted data only when the received data received by the data reception part comprises a transmission request; and an autonomous node, operating in an autonomous mode in which the data generated by the data generation part of the own node is transmitted as the transmitted data regardless of reception of the received data comprising the transmission request.

DESCRIPTION OF THE EMBODIMENTS

Figure 1:
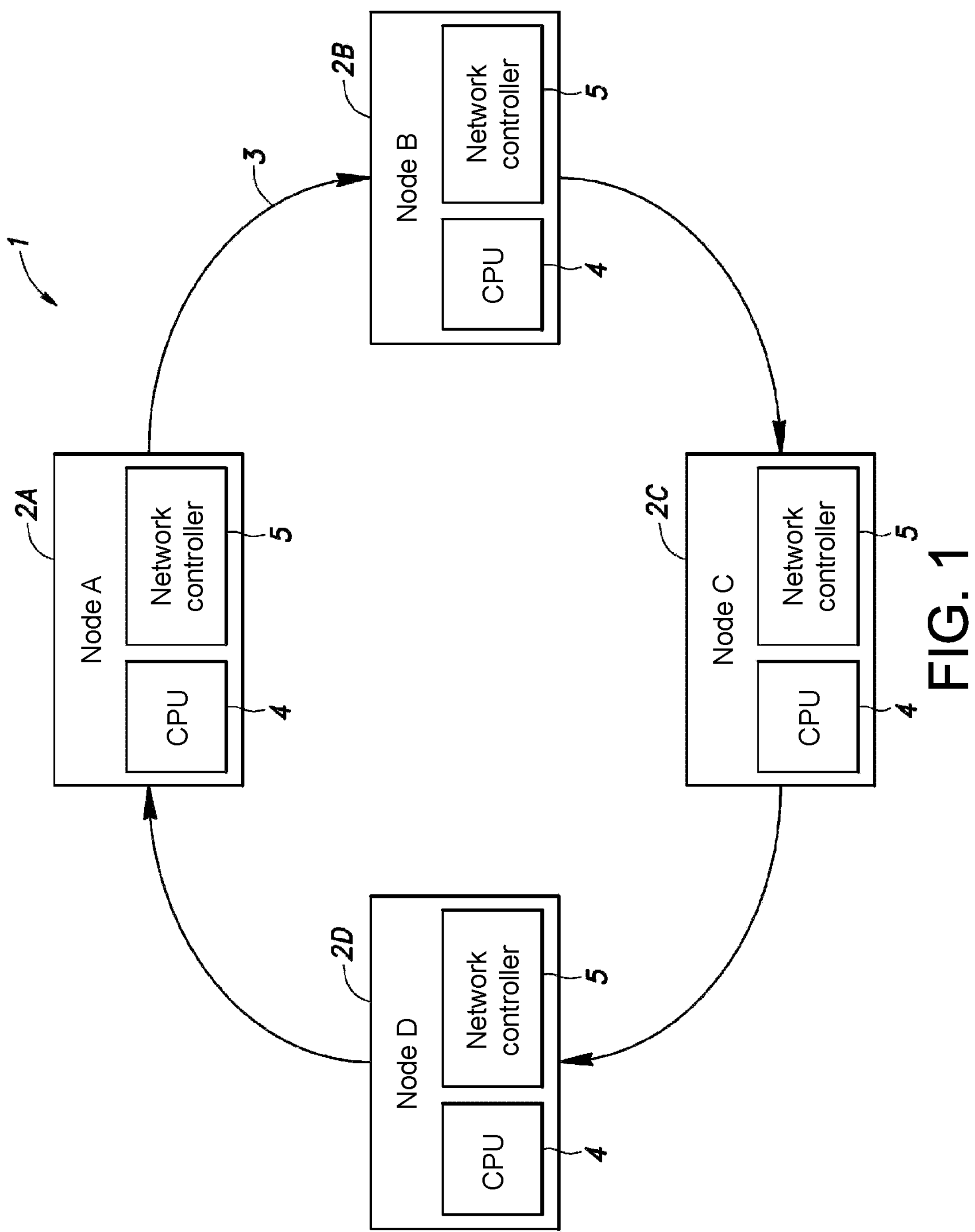
FIG. 1 is a schematic diagram illustrating a configuration of a communication system according to an embodiment.

The invention provides a ring network communication system with a short control period and capable of transmitting and receiving required data at suitable timings.

In order to solve the above issues, an aspect of the invention provides a ring network communication system (1) for transmitting data in a direction in a ring network (3) in which a plurality of nodes (2) are formed in a ring shape. Each of the nodes includes: a data generation part (8), generating data to be transmitted to another node; a data transmission part (12), having a data transmission block (16)

transmitting data generated by the data generation part of an own node as generated data (Dp) and a data relay block (15) transmitting data transmitted from the another node as relay data (Dr) to be relayed; an output switching part (17), switching data transmitted to the another node as the generated data transmitted by the data transmission block and the relay data relayed by the data relay block and outputting the data as transmitted data (Dt); and a data reception part (13), receiving the transmitted data transmitted from the another node as received data (Dir). The nodes include: a heteronomous node (22), operating in a heteronomous mode in which data generated by the data generation part of the own node is transmitted as the transmitted data only when the received data received by the data reception part comprises a transmission request; and an autonomous node (23), operating in an autonomous mode in which the data generated by the data generation part of the own node is transmitted as the transmitted data regardless of reception of the received data comprising the transmission request.

According to the aspect, even if the autonomous node does not receive the received data including the transmission request, the autonomous node still transmits the data generated by the data generation part of the own node. Therefore, the another node is not required to transmit data including the transmission request to the autonomous node. Therefore, the control period can be shortened by reducing the data transmission process. In addition, the autonomous node can transmit data at a suitable timing. Accordingly, data transfer efficiency is facilitated.

It may also be that the nodes have switchable operation modes between the heteronomous mode and the autonomous mode, and are configured to operate in the operation mode that is selected.

According to the aspect, by switching between the heteronomous mode and the autonomous mode in accordance with the state of each node, the control period can be shortened by reducing the data transmission process.

In the above aspect, it may also be that when the received data received by the data reception part of the own node includes a mode request requesting the heteronomous mode or the autonomous mode, the nodes are configured to switch the operation mode to a mode in accordance with the mode request.

According to the aspect, one node functioning as the central control unit is able to switch the operation modes of other nodes.

In the above aspect, it may also be that the nodes include an arithmetic processing device (4) which executes an arithmetic process and a network controller (5) performing data transmission and reception, the arithmetic processing device forms the data generation part (8) and switches between the heteronomous mode and the autonomous mode by switching the operation mode of the data generation part.

According to the aspect, the heteronomous mode and the autonomous mode are easily switchable through the process by using the arithmetic processing device.

In the above aspect, it may also be that a node operating in the heteronomous mode is a node (22) that performs driving control on an actuator (6), and a node (23) operating in the autonomous mode is a node obtaining sensor data from a sensor (7).

According to the aspect, the node driving and controlling the actuator 6 transmits the data generated by the data generation part (8) of the own node only when receiving the received data including the transmission request. Therefore, the data transmission process is reduced, and it is possible to shorten the control period.

In the above aspect, it may also be that the data generation part of the node obtaining the sensor data is configured to generate data when a value of the sensor data that is obtained changes, and not generate data when the value of the sensor data that is obtained does not change.

According to the aspect, the node obtaining the sensor data does not generate and transmit data when the value of the sensor data does not change. Therefore, the data transmission process is reduced, and it is possible to shorten the control period.

In the above aspect, it may also be that a node operating as the heteronomous node is a node performing driving control on an actuator, and is configured to transition to the autonomous mode when a failure of the actuator is detected.

According to the aspect, the node operating as the heteronomous node can be transitioned to the autonomous node even if there is no mode change request from another node, and the transmitted data generated by the data generation part can be transmitted when the actuator fails.

In the above aspect, it may also be that the ring network communication system is configured to control an operation of a robot, and at least one of the nodes switches between the heteronomous mode and the autonomous mode in accordance with switching of an operation state of the robot.

According to the aspect, the operation mode of the node can be switched at a suitable timing in accordance with switching of the operation state of the robot. Thus, the data transmission process can be suitably reduced, and the control period can be effectively shortened.

According to the above aspect, in the ring network communication system, the control period is short, and required data can be transmitted and received at suitable timings.

Embodiments of a ring network communication system (hereinafter simply referred to as communication system 1) according to the invention will be described below with reference to the drawings.

FIG. 1 is a schematic diagram illustrating a configuration of the communication system 1 according to an embodiment. As shown in FIG. 1, the communication system 1 is formed by multiple (four in the example as shown) nodes 2 (2A, 2B, 2C, 2D) and a ring network 3 in which the nodes 2 are communicably connected in a ring shape. In the communication system 1, each node 2 includes a CPU 4, which is an arithmetic processing device executing an arithmetic process, and a network controller 5 configured to transmit data in a direction in the ring network 3. That is, the nodes 2 are communicably connected via the ring network 3 that is communicably connected in a ring shape and performs communication in a direction of the ring.

In addition to the CPU 4 and the network controller 5, each node 2 may include a storage device (a memory such as a ROM, a RAM, etc.), and is configured as a computer executing various processes as required. The execution of the various processes by the node 2 indicates that the arithmetic processing device (CPU 4) reads required data and application software from the storage device (memory) and is programmed to execute a predetermined arithmetic process in accordance with such software.

It is noted that the ring network 3 refers to a logical communication configuration, and is not required to be a physical ring-shaped configuration. In addition, the communicable communication includes wireless connection, in addition to physical connection via a communication wire.

The nodes 2 perform the arithmetic processes using the software by the CPU 4, and, based on the data output by the arithmetic process, control the operations of corresponding actuators 6 formed by hardware. Alternatively, the nodes 2 may perform arithmetic processes using software by the CPU 4 on the data output from the corresponding sensors 7 formed by hardware, and generate and transmit data in a predetermined unit (e.g., packet). The nodes 2 may perform at least one or both of operation control of the actuators 6 and data transmission of the sensors 7.

Hardware refers to an electronic device electrically connected to a power source and includes, for example, an electric motor or an electromagnetic valve, a lighting fixture, an electric element, the sensor 7, and drivers controlling power supply to the aforementioned, etc. For example, the communication system 1 is mounted in a robot which operates autonomously or through a remote operation, and is configured as a distributed control system in which the nodes 2 control the respective parts of the robot. In such case, the power source may be mounted in the robot, and may also be connected to the robot via a power wire without being mounted in the robot.

Figure 2:
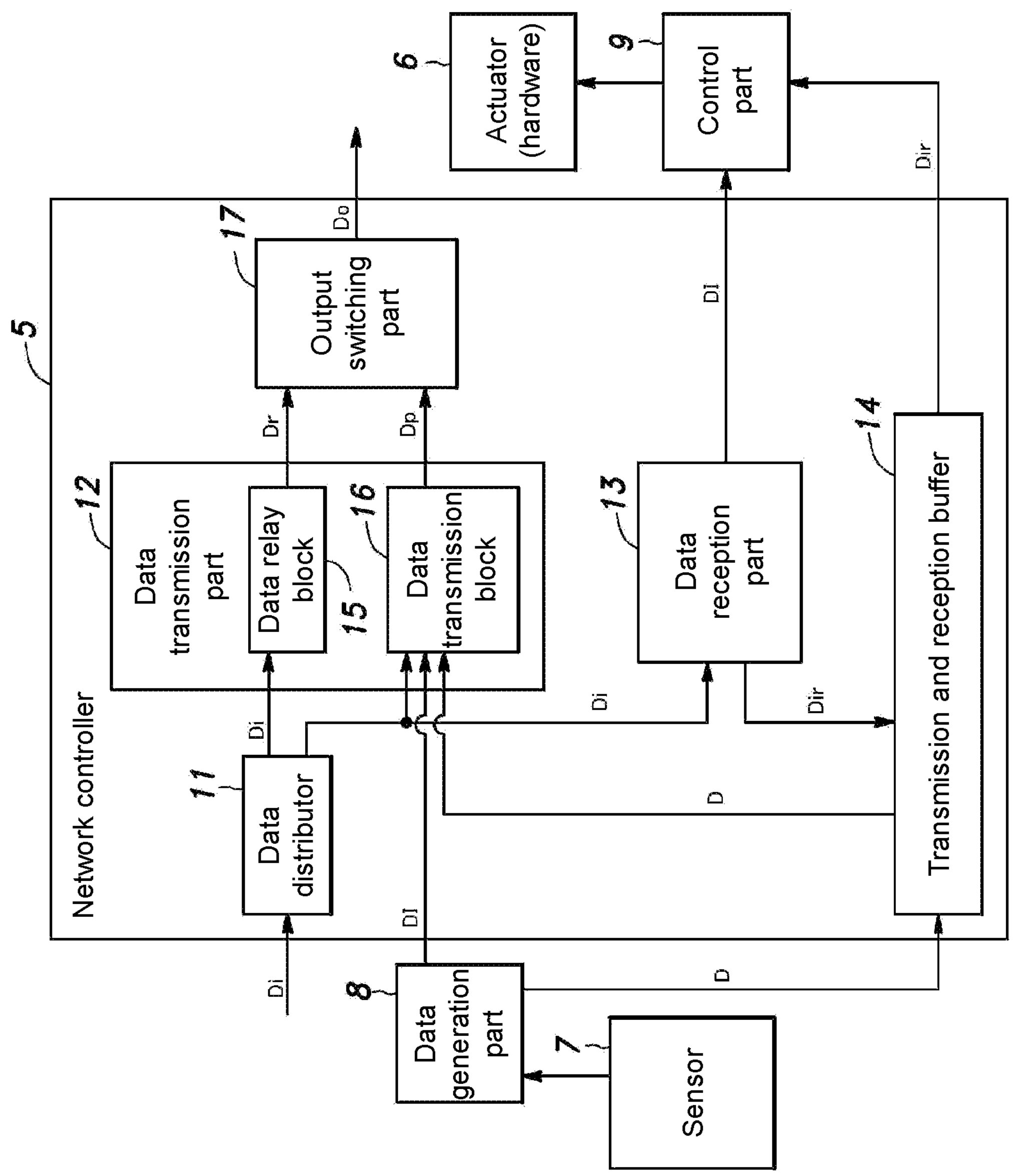
FIG. 2 is a functional block diagram illustrating each node shown in FIG. 1.

FIG. 2 is a functional block diagram illustrating each node shown in FIG. 1. As shown in FIG. 2, each node 2 has the network controller 5 formed by hardware, and a software-driven data generation part 8 and a control part 9 as functional parts formed by the CPU 4. The data generation part 8 performs the arithmetic process using software by the CPU 4, and generates data D to be transmitted to another node 2. The control part 9 performs the arithmetic process using software by the CPU 4 based on the data received from another node 2, and performs driving control on the actuator 6.

Figure 3:
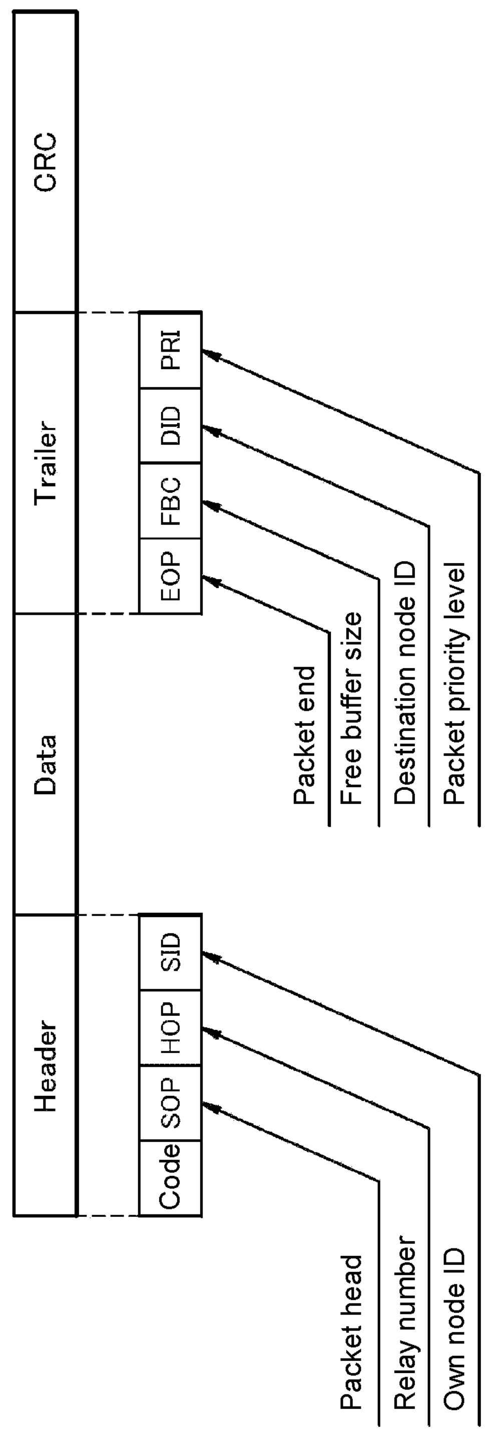
FIG. 3 is a diagram illustrating a configuration of a data packet.

In each node 2, data transmitted from the upstream side of the ring network 3 is input to the network controller 5. In the embodiment, data is transmitted on the ring network 3 by using packet as a unit, that is, as data packets. As shown in FIG. 3, the data packet is formed by a frame including a header, data, a trailer, and a CRC. The header is formed by a code, a packet head (SOP), a relay number (HOP), and an own node ID (SID). The trailer is formed by a packet end (EOP), a free buffer size (FBC), a destination node ID (DID), and a packet priority level (PRI).

Referring to FIG. 2 again, the network controller 5 has a data distributor 11. The data input to each node 2 (referred to as input data Di in the following) is respectively distributed to a data transmission part 12 and a data reception part 13 by using the data distributor 11.

The data generation part 8 writes the data D generated for another node 2 into a transmission and reception buffer 14, and transmits information (referred to as data information DI in the following) relating to data, such as code, priority level, etc., to the data transmission part 12.

The data transmission part 12 has a data relay block 15 and a data transmission block 16. In the case where the input data Di distributed from the data distributor 11 is data that includes another node as the transmission destination, the data relay block 15 transmits the input data Di as relay data Dr. The data transmission block 16 reads the data D corresponding to the data information DI written by the data generation part 8 from the transmission and reception buffer 14, and transmits the data D as generated data Dp.

In the case where the input data Di distributed from the data distributor 11 is data to be received that includes its own node as the transmission destination, the data reception part 13 receives the input data Di as received data Dir and writes the received data Dir in the transmission and reception buffer 14. In addition, the data reception part 13 transmits the data information DI of the received data Dir to the control part 9. The received data Dir written into the transmission and reception buffer 14 is read by the control part 9 based on the data information DI and provided to the control part 9.

The relay data Dr transmitted from the data relay block 15 and the generated data Dp transmitted from the data transmission block 16 are input to the output switching part 17. The output switching part 17 switches data to be transmitted to another node between the generated data Dp transmitted by the data transmission block 16 and the relay data Dr transmitted by the data relay block 15, and outputs the data as transmitted data Dt. The transmitted data Dt is so switched, and there is no data collision. Therefore, multiple nodes 2 can transmit data in the ring network 3 at the same time.

It is noted that it is not required that all nodes 2 be provided with the these functions. For example, in a node 2 which does not perform operation control on the actuator 6, the control part 9 does not perform operation control on the actuator 6 based on the data received from another node 2. Instead, in such node 2, the data generation part 8 may generate a data transmission request to another node 2 or generate data including a control command including a driving request of the actuator 6 and a data transmission request to another node 2. In a configuration in which one of the nodes 2 issues a transmission request or a control command to other nodes 2, such node 2 functions as a central electronic control unit (ECU) 21 (see FIG. 4) which is a central control device controlling other nodes 2.

In the following, the communication system 1 suitable for a robot is described with reference to FIGS. 4 to 9.

Figure 4:
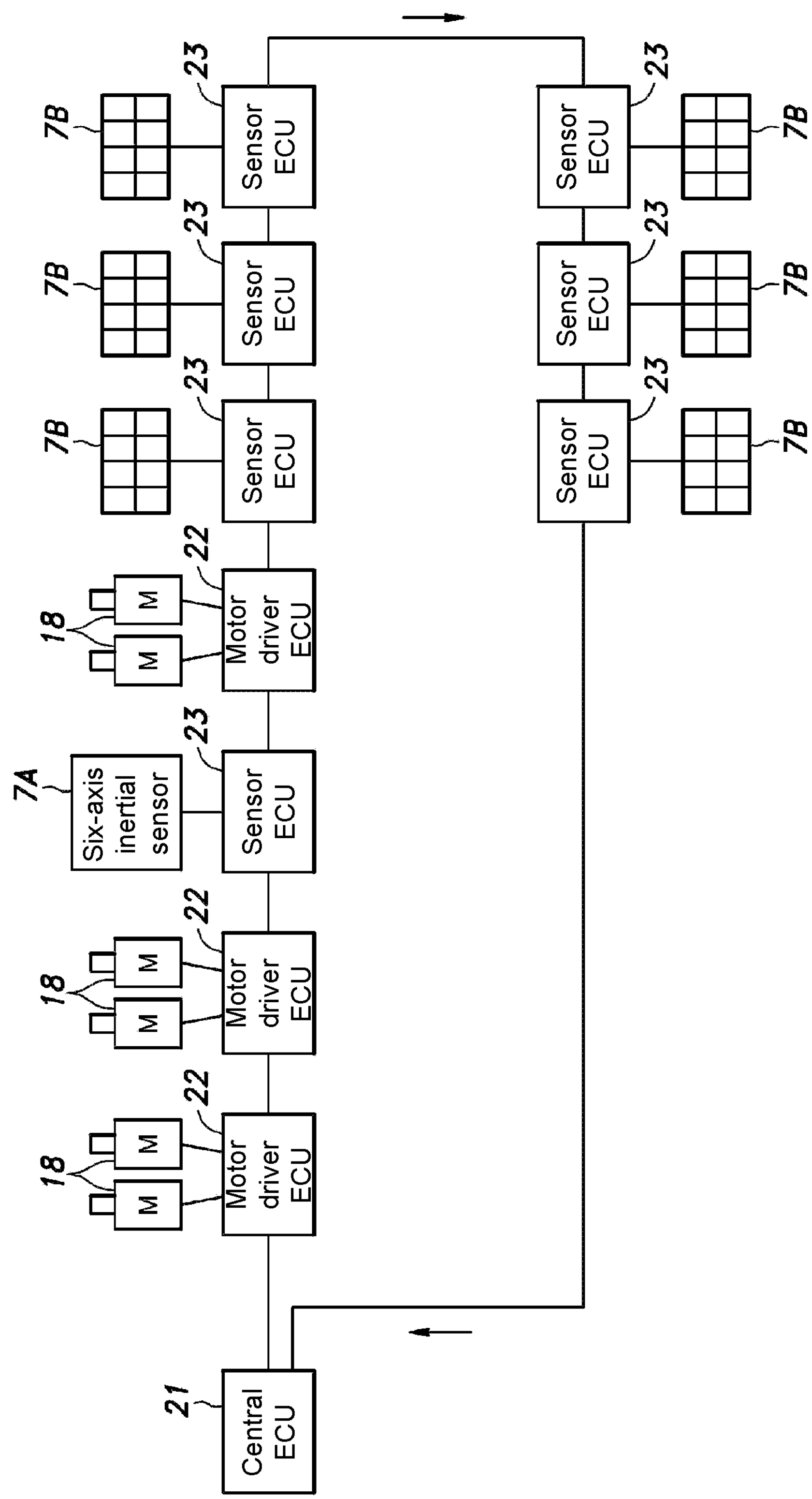
FIG. 4 is a diagram illustrating a configuration of a communication system suitable for a robot.

FIG. 4 is a diagram illustrating a configuration of the communication system 1 suitable for a robot. The robot is arranged in a multi-link structure having multiple joints. Each joint is configured to be rotatable about two axes. In another embodiment, the joint may also be configured to be rotatable about one axis or three axes, and may also be configured to be slidable in one or more directions. Each joint (more specifically, the link portion before each joint) forms the actuator 6 (FIG. 3). The actuator 6 includes two motors 18 as driving parts provided with respect to the respective axes. In another embodiment, the actuator 6 may also include a pump as the driving part, and be driven by a hydraulic pressure or a pneumatic pressure.

In the actuator 6 (more specifically, the link portion before each joint), the sensor 7 is provided. The sensor 7 (7A, 7B) includes a six-axis inertial sensor 7A and a contact sensor 7B. The six-axis inertial sensor 7A detects accelerations in three axial directions orthogonal to each other and angular velocities about the three axes. The contact sensor 7B forms a matrix configuration in which multiple sensor elements are arranged in two directions orthogonal to each other, and detects a contact pressure or a load in a predetermined region on the outer surface of the robot.

The communication system 1 includes the central ECU 21 formed by the node 2, multiple motor driver ECUs 22 driving and controlling the motors 18 of the actuators 6, and multiple sensor ECUs 23 controlling the sensors 7 (7A, 7B). Each of the motor drivers ECU 22 includes the node 2, controls the motor 18 connected to the own node, and transmits data. Each of the sensor ECUs 23 includes the node 2, obtains sensor data from the sensor 7 (7A, 7B) connected to the own node, and transmits the sensor data. The sensors 7 (7A, 7B) may also be connected to the motor driver ECU 22. In such case, the motor driver ECU 22 further obtains and transmits the sensor data.

Figure 5:
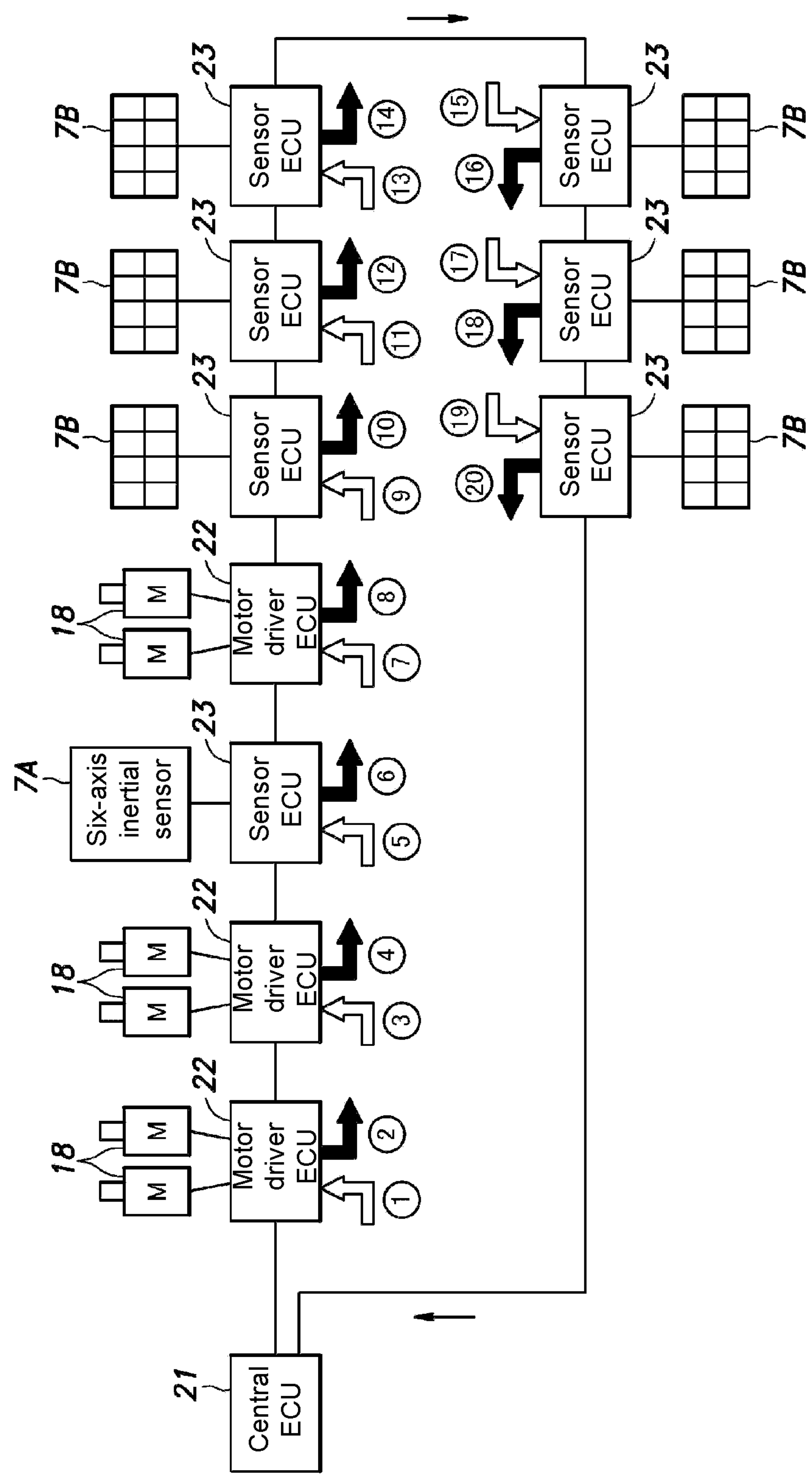
FIG. 5 is a diagram illustrating a control method according to a comparative example of a communication system.

Before describing the control method of the communication system 1 according to the embodiment, a conventional control method using the communication system 1 is described with reference to FIGS. 5 and 6. FIG. 5 is a diagram illustrating a control method according to a comparative example of the communication system 1. As shown in FIG. 5, the central ECU 21 controls the motor driver ECUs 22 and the sensor ECUs 23.

Specifically, the central ECU 21 transmits motor control commands (motor driving requests and data transmission requests) or data transmission requests to all the other ECUs (motor driver ECUs 22 and sensor ECUs 23, that is, other nodes 2) in order. The motor control commands (motor driving requests and data transmission requests) are transmitted to the motor driver ECUs 22. The data transmission requests are transmitted to the sensor ECUs 23. In FIG. 3, the transmission order is indicated by the numbers in circles. The order of data transmission performed by the central ECU 21 is an odd number.

The motor driver ECU 22 receiving the motor control command controls the corresponding motor 18 based on the motor control command, and transmits data including the own node state, the angle of the motor 18, the angular velocity of the motor 18, the motor torque (current value), etc., to the central ECU 21. The order in which the motor driver ECU 22 performs data transmission is an even number greater than the order of the motor control command to the own node by 1.

The sensor ECU 23 receiving the data transmission request, based on the data transmission request, obtains sensor data from the sensor 7, and transmits data including the own node state, the sensor data, etc., to the central ECU 21. The data transmission performed by the sensor ECU 23 is an even number greater than the order of the data transmission request to the own node by 1.

Figure 6:
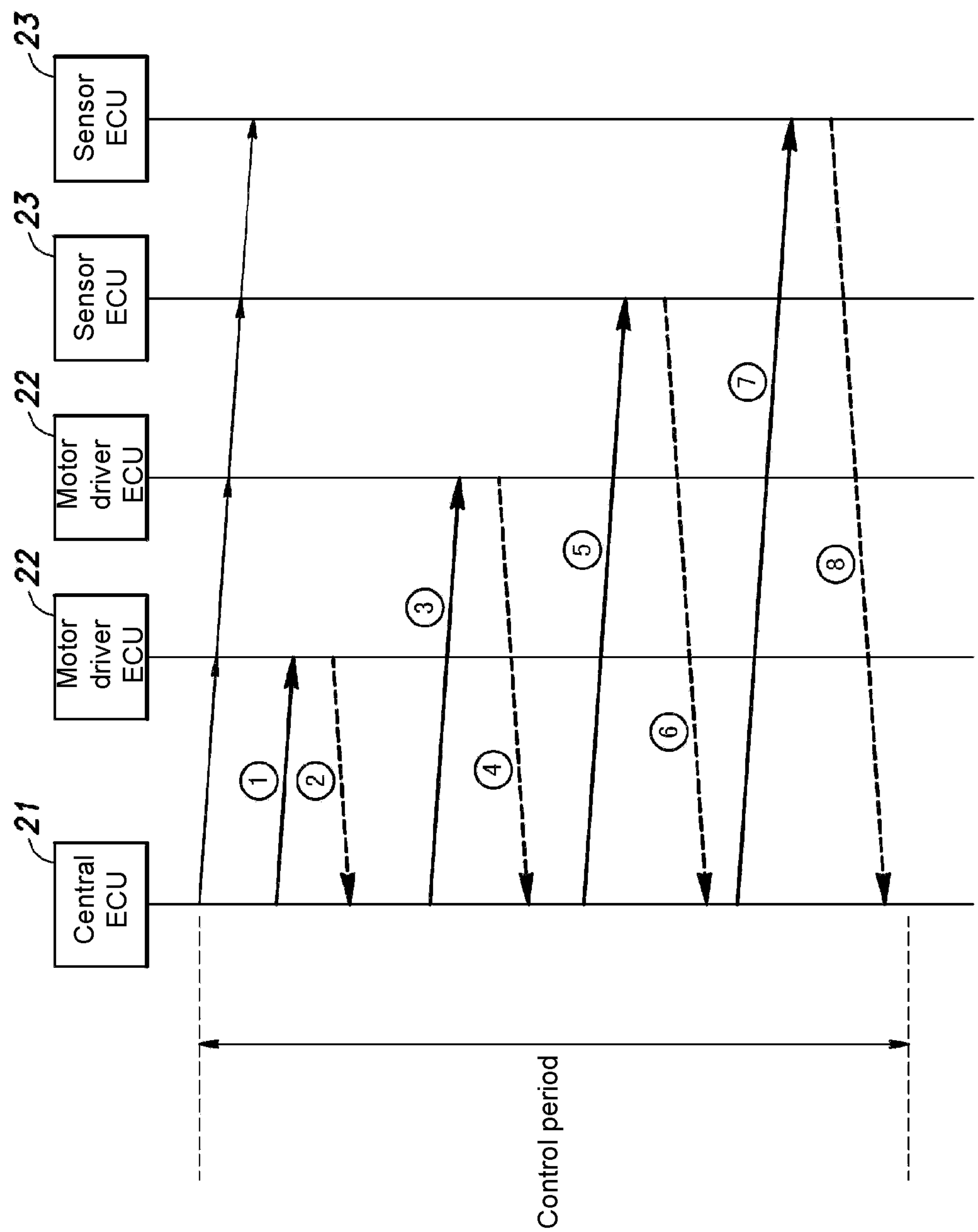
FIG. 6 is a diagram illustrating a control period according to a comparative example of a communication system.

FIG. 6 is a diagram illustrating a control period according to a comparative example of the communication system 1. The vertical axis of FIG. 6 indicates time. In the control according to the comparative example, in this way, the central ECU 21 transmits data to all the motor driver ECUs 22 and sensor ECUs 23, and all the motor driver ECUs 22 and sensor ECUs 23 transmit data to the central ECU 21. The data transmission performed by the central ECU 21 to all the other nodes (motor driver ECUs 22 and sensor ECUs 23) and the data transmission performed by all the other nodes 2 to the central ECU 21 form the control of one cycle. The control period is determined by the time required by the control of one cycle.

Figure 7:
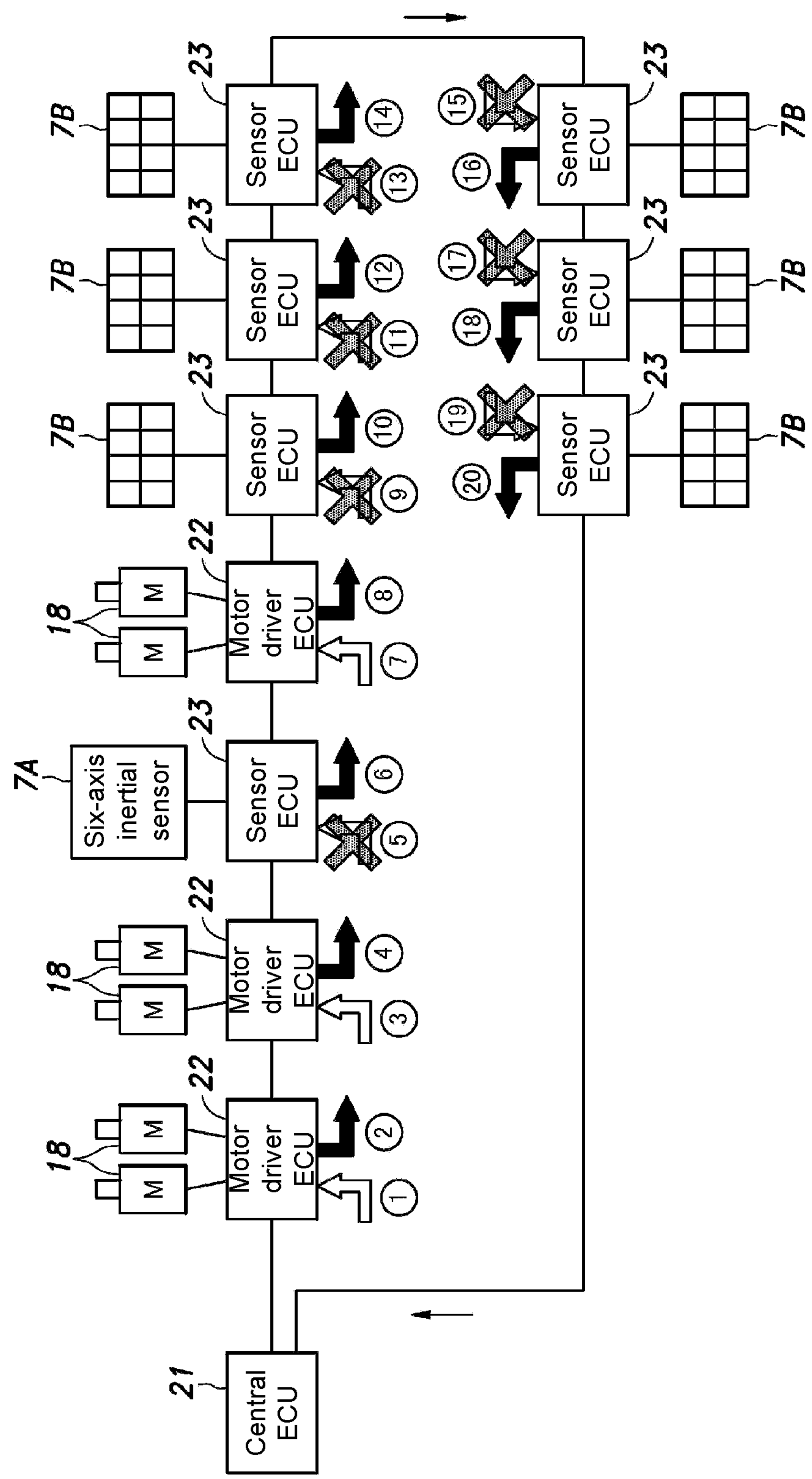
FIG. 7 is a diagram illustrating a control method of a communication system according to an embodiment.

Then, a control method of the communication system 1 according to the embodiment is described with reference to FIGS. 7 and 8. FIG. 7 is a diagram illustrating the control method of the communication system 1 according to an embodiment. As shown in FIG. 7, the central ECU 21 controls the motor driver ECUs 22. Specifically, the central ECU 21 transmits motor control commands (motor driving requests and data transmission requests) to all the motor driver ECUs 22 in order.

The motor driver ECU 22 receiving the motor control command controls the corresponding motor 18 based on the motor control command, and transmits data including the own node state, the angle of the motor 18, the angular velocity of the motor 18, the motor torque (current value), etc., to the central ECU 21. That is, the motor driver ECU 22 is a heteronomous node operating in a heteronomous mode in which the data generated by the data generation part 8 of the own node is transmitted as the transmitted data Dt only in the case where the received data Dir received by the data reception part 13 of FIG. 2 includes the data transmission request.

Meanwhile, the sensor ECU 23 operates autonomously to transmit data without being controlled by the central ECU 21. That is, the sensor ECU 23 is an autonomous node operating in an autonomous mode in which the data generated by the data generation part 8 of the own node is transmitted as the transmitted data Dt regardless of the reception of the received data Dir including the data transmission request.

Figure 8:
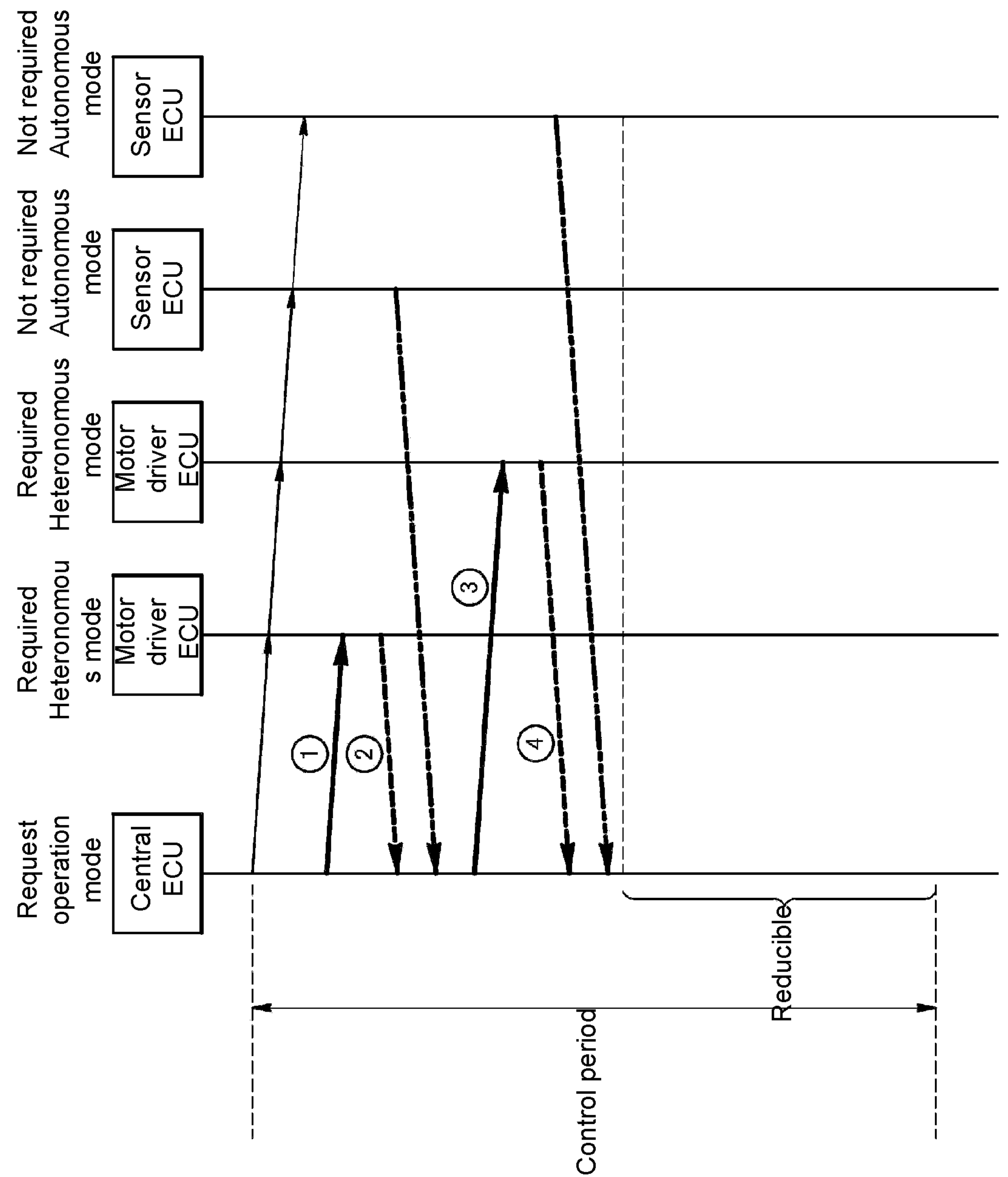
FIG. 8 is a diagram illustrating a control period of a communication system according to an embodiment.

FIG. 8 is a diagram illustrating the control period of the communication system 1 according to an embodiment. FIG. 8 corresponds to FIG. 6, and the vertical axis thereof indicates time. In the control according to the embodiment, in this way, the central ECU 21 transmits data to the motor driver ECUs 22 operating in the heteronomous mode, and does not transmit data to the sensor ECUs 23. The sensor ECU 23 operating in the autonomous mode transmit data at a suitable timing.

That is, the sensor ECU 23 operating in the autonomous mode transmits the data generated by the data generation parts 8 of the own node even though the sensor ECU 23 does not receive the received data Dir including the data transmission request. Therefore, it is not necessary for the central ECU 21 to transmit data including the data transmission request to the sensor ECU 23 operating in the autonomous node. Therefore, the data transmission process is reduced, and the control period required for the control of one cycle can be shorter than the comparative example of FIG. 6. In addition, since the sensor ECU 23 operating in the autonomous mode is able to transmit data at a suitable timing, the data transmission efficiency is facilitated.

The sensor ECU 23 operating in the autonomous mode, for example, may transmit data at a suitable timing in each control period. Alternatively, the sensor ECU 23 may transmit data when the detected value of the six-axis inertial sensor 7A changes, or may also transmit data when the contact sensor 7B detects a contact or when a pressure changes a contact value such as load. Specifically, in the contact sensor 7B including multiple sensor elements arranged in a matrix, if the sensor data of all the sensor elements are transmitted in each control period, the data transmission volume increases, and the control period is lengthened. Therefore, in the case where an event including a change of the value of the sensor 7 occurs as described above, the sensor ECU 23 may operate in an event-driven manner.

Figure 9:
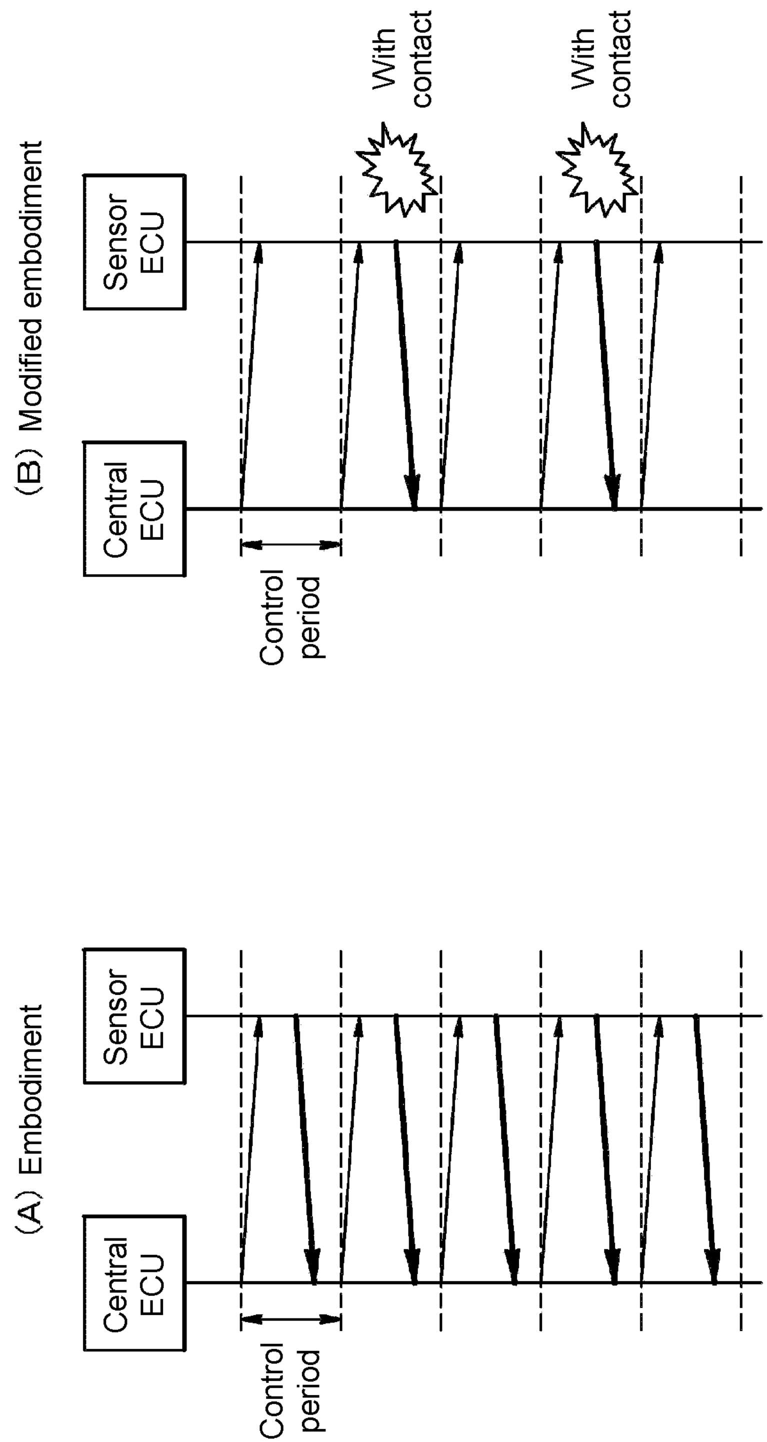
In FIG. 9, (A) is a diagram illustrating a control period of a communication system of an embodiment, and (B) is a diagram illustrating a control period of a communication system according to a modified embodiment.

In FIG. 9, (A) is a diagram illustrating a control period of the communication system 1 of an embodiment, and (B) is a diagram illustrating a control period of the communication system 1 of a modified embodiment operating in an event-driven manner. In the case of (A) of FIG. 9, the sensor ECUs 23 transmit sensor data to the central ECU 21 in each control period. Comparatively, in the modified embodiment of (B) of FIG. 9, the sensor ECUs 23 transmit sensor data to the central ECU 21 when an event with a touch occurs. Therefore, compared with the case of the embodiment in (A) of FIG. 9, the data transmission volume when there is no event is significantly reduced.

In these embodiments, the nodes 2 operating in the heteronomous mode are the motor driver ECUs 22 driving and controlling the actuators 6, and the nodes 2 operating in the autonomous mode are the sensor ECUs 23 obtaining sensor data from the sensor 7. That is, the motor driver ECU 22 driving and controlling the actuator 6 transmits the generated data Dp generated by the data generation part 8 of the own node only in the case of receiving the received data Dir including the transmission request. Therefore, the data transmission process is reduced, and the control period is shortened.

Moreover, the data generation part 8 of the sensor ECU 23 obtaining the sensor data is configured to generate data when the value of the sensor data that is obtained changes, and not generate data when the value of the sensor data that is obtained does not change. That is, the sensor ECU 23 obtaining sensor data does not generate and transmit data when the value of the sensor data does not change. Accordingly, the data transmission process is reduced, and it is possible to shorten the control period.

Referring to FIG. 6 again, other embodiments of the invention will be described in the following. In the embodiment, the motor driver ECU 22 operates in the heteronomous mode, and the sensor ECU 23 operates in the autonomous mode. In other embodiments, the nodes 2 (the motor driver ECUs 22 and the sensor ECUs 23) are provided with switchable operation modes between the heteronomous mode and the autonomous mode.

Specifically, the data generation part 8 is provided with the autonomous mode in which data is generated at a suitable timing regardless of the reception of the data transmission request as well as the heteronomous mode in which data is generated only when the data transmission request is received. The data generation part 8 is configured to transmit data in the operation mode that is selected. The suitable timing, for example, may be the time when an event in which the value of the sensor 7 changes occurs.

By switching between the heteronomous mode and the autonomous mode in accordance with the state of each node 2 in this way, the data transmission process is reduced, and, as a result, the control period is shortened.

The switching of the operation mode is performed based on a control command from the central ECU 21. Specifically, in the central ECU 21, the data generation part 8 generates data including mode requests requesting the heteronomous mode or the autonomous mode for other nodes 2, and the output switching part 17 outputs such data as the transmitted data Dt. In the node 2 of the transmission destination of such data, the data generation part 8 is configured to switch the operation mode to the mode in accordance with the mode request if the data reception part 13 receives the data including the mode request.

Accordingly, the central ECU 21 can switch the operation modes of other nodes 2.

According to the above, in the node 2 other than the central ECU 21, the CPU 4 that is the arithmetic processing device forms the data generation part 8, and switches between the heteronomous mode and the autonomous mode by switching the operation mode of the data generation mode 8. Accordingly, the heteronomous mode and the autonomous mode are easily switchable in accordance with the process carried out by the CPU 4.

Yet another embodiment is described in the following. In this embodiment as well, the motor driver ECU driving and controlling the actuator 6 operates in the heteronomous mode, and the sensor ECU 23 operates in the autonomous mode. Meanwhile, the motor driver ECU 22 is configured to detect a failure of the actuator 6, and, in the case where a failure of the actuator 6 is detected, transition to the autonomous mode.

In the embodiment, the node 2 forming the motor driver ECU 22 operating as the heteronomous node can be transitioned to the autonomous mode even though the node 2 does not receive the mode change request from another node 2 as the central ECU 21. Accordingly, the motor driver ECU 22 operating as the heteronomous node can transmit the transmitted data Dt generated by the data generation part 8 to another node 2 in the case where the actuator 6 has a failure.

Alternatively, the motor driver ECU 22 performing driving control on the actuator 6 may also be configured to switch between the heteronomous mode and the autonomous mode in accordance with the switching of the operation mode of the robot.

For example, in the case of a walking robot, the motor driver ECU 22 switches from the heteronomous mode to the autonomous mode at the time of an operation state in which a leg is switched from a free leg to a supporting leg. In addition, at the time of the operation state in which the leg is switched from the supporting leg to the free leg, the motor driver ECU 22 is switched from the autonomous mode to the heteronomous mode.

In the case of an arm robot, when the arm is switched from an operation of approaching an object (reaching: a low response operation without contact to the environment) to an operation of holding an object (a high response operation with contact to the environment/human being), the motor driver ECU 22 is switched from the heteronomous mode to the autonomous mode.

In this way, the node 2 switches between the heteronomous mode and the autonomous mode in accordance with the switching of the operation state of the robot. Accordingly, the node 2 can switch the operation mode at a suitable timing. Thus, the data transmission process can be suitably reduced, and the control period can be effectively shortened. It is noted that not all the motor driver ECUs 22 need to be so configured, and the above effect can be obtained by so configuring at least one motor driver ECU 22.

Although the specific embodiments have been described above, the invention is not limited to the above embodiments and can be widely modified. For example, in the above embodiments, the communication system 1 applied to a robot is described as an example, but the communication system 1 can be widely applied to systems other than robots. In addition, the specific configuration, arrangement, quantity, control method, etc. of each member and part can be changed as appropriate within the scope of the invention. Meanwhile, not all of the components shown in the above embodiments are essential, and can be selected as appropriate.

What is claimed is:

1. A ring network communication system for transmitting data in a direction in a ring network in which a plurality of nodes are formed in a ring shape, wherein each of the nodes comprises:

a data generation part, generating data to be transmitted to another node;

a data transmission part, having a data transmission block transmitting data generated by the data generation part of an own node as generated data and a data relay block transmitting data transmitted from the another node as relay data to be relayed;

an output switching part, switching data transmitted to the another node as the generated data transmitted by the data transmission block and the relay data relayed by the data relay block and outputting the data as transmitted data; and a data reception part, receiving the data transmitted from the another node as received data, wherein the nodes comprise:

a heteronomous node, operating in a heteronomous mode in which data generated by the data generation part of the own node is transmitted as the transmitted data only when the received data received by the data reception part comprises a transmission request; and an autonomous node, operating in an autonomous mode in which the data generated by the data generation part of the own node is transmitted as the transmitted data regardless of reception of the received data comprising the transmission request.

2. The ring network system as claimed in claim 1, wherein the nodes have switchable operation modes between the heteronomous mode and the autonomous mode, and are configured to operate in the operation mode that is selected.

3. The ring network system as claimed in claim 2, wherein when the received data received by the data reception part of the own node comprises a mode request requesting the heteronomous mode or the autonomous mode, the nodes are configured to switch the operation mode to a mode in accordance with the mode request.

4. The ring network system as claimed in claim 3, wherein the nodes comprise an arithmetic processing device which executes an arithmetic process and a network controller performing data transmission and reception, wherein the arithmetic processing device forms the data generation part and switches between the heteronomous mode and the autonomous mode by switching the operation mode of the data generation part.

5. The ring network system as claimed in claim 1, wherein a node operating in the heteronomous mode is a node that performs driving control on an actuator, and a node operating in the autonomous mode is a node obtaining sensor data from a sensor.

6. The ring network system as claimed in claim 5, wherein the data generation part of the node obtaining the sensor data is configured to generate data when a value of the sensor data that is obtained changes, and not generate data when the value of the sensor data that is obtained does not change.

7. The ring network system as claimed in claim 2, wherein a node operating as the heteronomous node is a node performing driving control on an actuator, and is configured to transition to the autonomous mode when a failure of the actuator is detected.

8. The ring network system as claimed in claim 2, wherein the ring network communication system is configured to control an operation of a robot, and at least one of the nodes switches between the heteronomous mode and the autonomous mode in accordance with switching of an operation state of the robot.

* * * * *